US012657246B2

(12) United States Patent
Huang

(10) Patent No.: US 12,657,246 B2
(45) Date of Patent: Jun. 16, 2026

(54) SOCIAL MEDIA MAINTENANCE SYSTEM AND METHOD

(71) Applicant: Shellfans AI Technology Co., Ltd., Taipei City (TW)

(72) Inventor: Ruei-Chi Huang, New Taipei City (TW)

(73) Assignee: SHELLFANS AI TECHNOLOGY CO., LTD., Taipei City (TW)

( * ) Notice: Subject to any disclaimer, the term of this patent is extended or adjusted under 35 U.S.C. 154(b) by 0 days.

(21) Appl. No.: 18/819,140

(22) Filed: Aug. 29, 2024

(65) Prior Publication Data

US 2025/0124089 A1 Apr. 17, 2025

(30) Foreign Application Priority Data

Aug. 29, 2023 (TW) ................................. 112209201

(51) Int. Cl.
*G06F 16/951* (2019.01)

(52) U.S. Cl.
CPC .................................. *G06F 16/951* (2019.01)

(58) Field of Classification Search
CPC .. G06F 16/951; G06F 16/953; G06F 16/9532; G06F 16/9538; G06F 16/00
USPC ....................................................... 707/709
See application file for complete search history.

(56) References Cited

U.S. PATENT DOCUMENTS

2017/0295121 A1* 10/2017 Zhang ............... G06F 16/24578
2019/0190876 A1* 6/2019 Weinhold ............... G06Q 50/01
2023/0342866 A1* 10/2023 Wainwright ........... G06Q 50/00

FOREIGN PATENT DOCUMENTS

TW        202042528 A      11/2020
TW        M605351 U        12/2020
TW        M650107 U         1/2024

* cited by examiner

*Primary Examiner* — Michael Pham
(74) *Attorney, Agent, or Firm* — LANWAY IPR SERVICES; Chun-Ming Shih

(57) ABSTRACT

A social media maintenance system and its associated method comprise generating a dedicated bot based on the attributes of the social platform to which a user-designated channel for maintenance belongs. Subsequently, the dedicated bot joins the designated channel as a member of the channel and proceeds to crawl all member data within the channel to store and establish a member list. Furthermore, an associated bot is generated based on the attributes of the social platform. The associated bot performs a contextual establishment process with each member based on the member data in the member list. Through this contextual establishment process, member contextual information is obtained and used to create a messageable member list, which is stored. The associated bot then engages in private messaging with the messageable members based on the stored messageable member list.

8 Claims, 8 Drawing Sheets

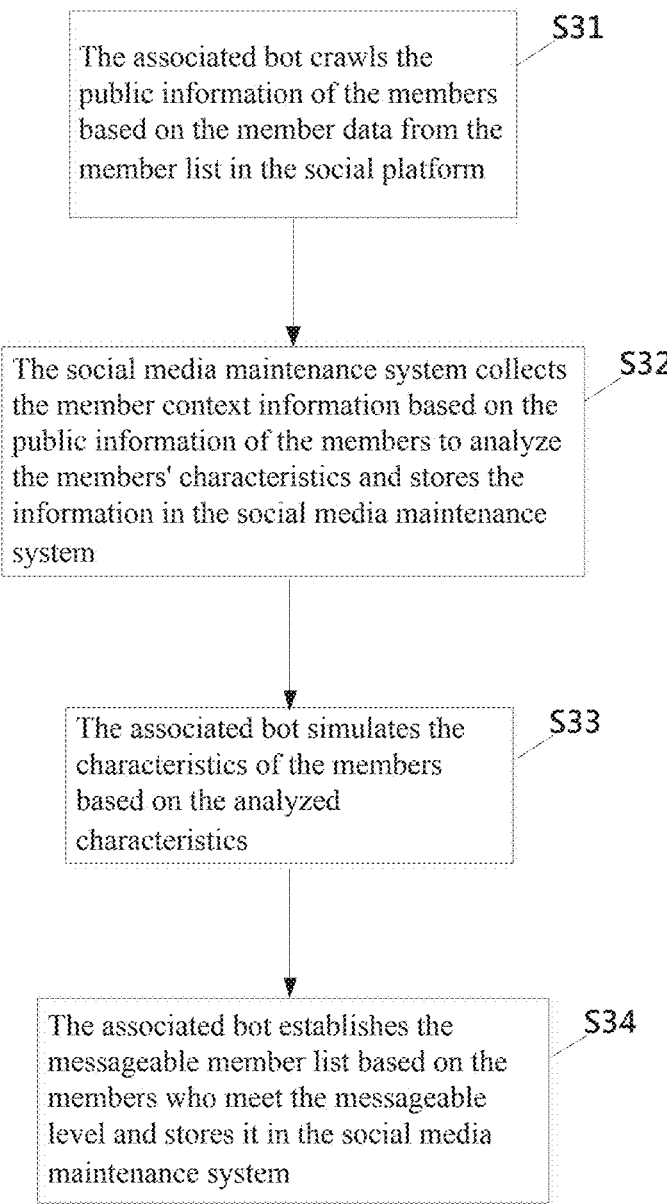

S31

The associated bot crawls the public information of the members based on the member data from the member list in the social platform

S32

The social media maintenance system collects the member context information based on the public information of the members to analyze the members' characteristics and stores the information in the social media maintenance system

S33

The associated bot simulates the characteristics of the members based on the analyzed characteristics

S34

The associated bot establishes the messageable member list based on the members who meet the messageable level and stores it in the social media maintenance system

FIG.6

SOCIAL MEDIA MAINTENANCE SYSTEM AND METHOD

CROSS-REFERENCE TO RELATED APPLICATIONS

This application claims the priority of Republic of China Patent Application No. 112209201 filed on Aug. 29, 2023, in the State Intellectual Property Office of the R.O.C., the disclosure of which is incorporated herein by reference.

BACKGROUND OF THE INVENTION

Field of the Invention

The present invention relates to a social media maintenance system and its associated method. More specifically, it pertains to a social media maintenance system and method that allows users such as social channel administrators, influencers, or key opinion leaders (KOLs) to send private messages to members of the channel without logging into the social channel.

Descriptions of the Related Art

In the context of the widespread use of social media, many individuals and enterprises have established their own social channels on various social platforms to interact with members of the channel (followers), share content, and promote products. However, a significant challenge in operating social channels arises, especially for influencers and key opinion leaders (KOLs). The disappearance of a social channel can be catastrophic, akin to the channel being hijacked, resulting in the original members of the channel (followers) potentially being unable to locate and continue interacting with the channel.

The issue of recovering original followers and post content after a social channel has disappeared is particularly pronounced in the following situations: (1) Platform Policy Changes: Social media platforms frequently update their policies and rules, which may lead to certain channels being banned or outright removed. Once a channel is blocked or deleted, its original followers can no longer access it or interact with it. (2) Violations of Platform Rules: Some channels are deleted due to violations of social media platform regulations, such as posting inappropriate content, engaging in malicious behavior, or being involved in illegal activities. Once removed, connections with followers are also severed. (3) User Misoperation Deleting an Account: Occasionally, users may accidentally delete their accounts, leading to the disappearance of the channel and making it impossible to restore the original follower group.

Therefore, for users who have diligently managed their social channels, including administrators, influencers, or KOLs, the need to back up social channels and ensure that followers or post content are not lost has become a critical issue.

SUMMARY OF THE INVENTION

In view of the drawbacks of the prior art mentioned above, the present application provides a social media maintenance method, which is provided for a user to process data under a channel of a social platform through a social media maintenance system, allowing the user to send private messages to a member of the channel without logging into the channel, and the social media maintenance method comprises the following steps: (1) the user logs into the social media maintenance system to submit a maintenance request, selects a social platform, and inputs a channel to be maintained under the social platform, and the social media maintenance system generates a dedicated bot based on the attributes of the social platform; (2) the dedicated bot joins the channel as a member of the channel, crawls the member data of all of members in the channel, and stores the member data in the social media maintenance system to establish a member list; (3) the social media maintenance system generates an associated bot based on the attributes of the social platform, and the associated bot performs a context-building task with each member based on the member data in the member list, and establishes a messageable member list based on the member context information obtained during the context-building process, which is stored in the social media maintenance system; and (4) the user submits a request to send private messages to a member through the social media maintenance system, enabling the associated bot to send private messages to a messageable member based on the stored messageable member list.

Preferably, the social media maintenance method said above, wherein in step (3), the context-building task comprises the following processing steps: the associated bot crawls the public information of the member from the social platform based on the member data in the member list and stores the public information in the social media maintenance system; the social media maintenance system collects member context information based on the public information of the member to analyze their features and stores the analyzed features in the social media maintenance system; the associated bot simulates the features of the member based on the analyzed features to make the features of the associated bot similar to those of the members it intends to simulate, thereby increasing the closeness of the contextual relationship between the associated bot and the member to be simulated to a messageable level; and the associated bot establishes a messageable member list based on a member who meets the messageable level and stores the list in the social media maintenance system, allowing the user to submit a request to send private messages to a member through the social media maintenance system and enabling the associated bot to send private messages to a messageable member based on the messageable member list.

Preferably, the social media maintenance method said above, wherein the dedicated bot crawls the channel content with a predetermined time frequency or access range to update or add to the member list, the messageable member list, or member features stored in the social media maintenance system.

Preferably, the social media maintenance method said above, wherein in step (3), the associated bot joins the channel and becomes one of the members of the channel, thereby increasing the closeness of the contextual relationship between the associated bot and a member.

Preferably, the social media maintenance method said above, wherein the features of the member comprise their geographical location, educational background, hobbies and interests, or other joined channels, and the geographical location refers to areas frequently visited, residence, or workplace of the member.

Preferably, the social media maintenance method said above, wherein in step (3), the social media maintenance system performs grouping based on the number of members of the channel in the member list and assigns a corresponding associated bot to each group, and each of the associated bots performs the context-building task with its respective member group.

Preferably, the social media maintenance method said above, wherein in step (3), if the social platform blocks the associated bot from performing the context-building task with a member, the social media maintenance system assigns another new associated bot to take over the context-building task performed by the blocked associated bot, and the new associated bot re-establishes the contextual relationships with the member based on the stored member context information.

Preferably, the social media maintenance method said above, wherein in step (2), the dedicated bot further crawls all posts in the channel and stores them in the social media maintenance system to enable the user to submit a channel restoration request through the social media maintenance system, creating a new channel on the social platform and restoring the channel content based on the stored posts.

Furthermore, the social media maintenance system in this invention, which is provided for a user to process data under a channel of a social platform, allowing the user to send private messages to a member of the channel without logging into the channel, and the social media maintenance system comprises: an application module for providing a service application operation interface, enabling the user to select a social platform and input a channel to be maintained under the social platform through the service application operation interface, and the application module generates a dedicated bot based on the attributes of the social platform and makes the dedicated bot join the channel as a member of the channel; a crawling module for enabling the dedicated bot that has joined the channel to crawl the content of the channel, crawling the member data of all members in the channel, and storing the member data to establish a member list; a context processing module for generating an associated bot based on the attributes of the social platform, and the associated bot performs the context-building task with each member based on the member data in the member list, establishes a messageable member list based on the member context information obtained during the context-building process, and stores a messageable member list; a message processing module for providing a private messaging operation interface, enabling the user to select a social platform and channel for private messaging through the interface and input a notification message to be sent, and the message processing module allows the associated bot to send the notification message to a messageable member based on the stored messageable member list.

Preferably, the social media maintenance method said above, wherein the context processing module enables the associated bot to crawl the public information of the member from the social platform based on the member data in the member list, collects member context information based on the public information, and analyzes member features, and the associated bot simulates member features based on the analyzed features, making its features similar to a member it intends to simulate, thereby increasing the closeness of the contextual relationship to a messageable level and establishing and storing the messageable member list based on a member who meets the messageable level.

Preferably, the social media maintenance method said above, wherein the features of the member comprise their geographical location, educational background, hobbies and interests, or other joined channels, and the geographical location refers to areas frequently visited, residence, or workplace of the member.

Preferably, the social media maintenance method said above, wherein the crawling module enables the dedicated bot to crawl the channel content with a predetermined time frequency or access range to update or add to the stored member list.

Preferably, the social media maintenance method said above, wherein the context processing module performs grouping based on the number of members in the member list and provides each member group with a corresponding associated bot, and each of the associated bots performs the context-building task with its respective member group.

Preferably, the social media maintenance method said above, wherein if the social platform blocks the associated bot from performing the context-building task with a member, the context processing module assigns another new associated bot to take over the context-building task performed by the blocked associated bot, and the new associated bot re-establishes the contextual relationships with the member based on the stored member context information.

Preferably, the social media maintenance method said above, wherein the associated bot joins the channel and becomes one of the members of the channel, thereby increasing the closeness of the contextual relationship between the associated bot and a member.

Preferably, the social media maintenance method said above, further comprising a post library, wherein the crawling module further enables the dedicated bot to crawl all posts in the channel and store the posts in the post library.

Preferably, the social media maintenance method said above, wherein the crawling module enables the dedicated bot to crawl the channel content with a predetermined time frequency or access range to update or add to the post library.

Preferably, the social media maintenance method said above, further comprising a recovery processing module for providing a restoration operation interface, enabling the user to select a social platform and channel for restoration through the interface, creating a new channel on the social platform, and restoring the channel content based on the stored posts.

In summary, the social media maintenance system and method thereof of the present invention enable users to send private messages to a member of the channel of the social channel without logging into the channel. This effectively prevents situations where sudden and unexpected channel bans hinder interaction with a member of the channel. Moreover, the social media maintenance system and method thereof of the present invention can back up members of the channel and posts, allowing users to restore the original channel's posts to another channel as needed. Users can also send a "channel change" notification to the original members via private messaging, guiding them to the new channel or other social platforms. This ensures that even if the original channel is banned or encounters issues, members of the channel can still connect with the user through the new channel. Therefore, the social media maintenance system and method of the present invention provide users such as social channel managers, influencers, or KOLs with control over channel management, alleviating concerns about being held hostage by the social platform managing the channel.

BRIEF DESCRIPTION OF THE DRAWINGS

The above and other aspects, features and other advantages of the present invention will be more clearly understood from the following detailed description taken in conjunction with the accompanying drawings, in which:

FIG. 6 is a flowchart illustrating the processing flow for context establishment in step S3 of FIG. 5.

DETAILED DESCRIPTION OF THE PREFERRED EMBODIMENT

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

The social media maintenance system of the present invention allows users, such as community channel managers, influencers, or KOLs, to perform backup processing for their operated community channels. For example, it can back up the channel members list or posts of a community channel. Therefore, when a social platform unexpectedly blocks a community channel, the social media maintenance system of the present invention enables users to send private messages to a member of the blocked community channel without logging into the channel. This effectively prevents difficulties in interacting with members of the channel due to the community channel being blocked. Additionally, the system can restore the data of the community channel, such as creating a new channel on the social platform and restoring the channel content based on the stored posts, enabling the reproduction of all posts from the original community channel.

It should be noted that users who wish to perform backup operations for community channels through the social media maintenance system 1 of the present invention must first complete a membership registration in the system. As the membership registration process for online services is a necessary input procedure for identity verification before accessing such services, it will not be further elaborated here. Upon logging into the social media maintenance system of the present invention, the user can apply for services such as backing up member data and post content of the community channel. The system provides corresponding services based on the permissions requested by the user.

Figure 1:
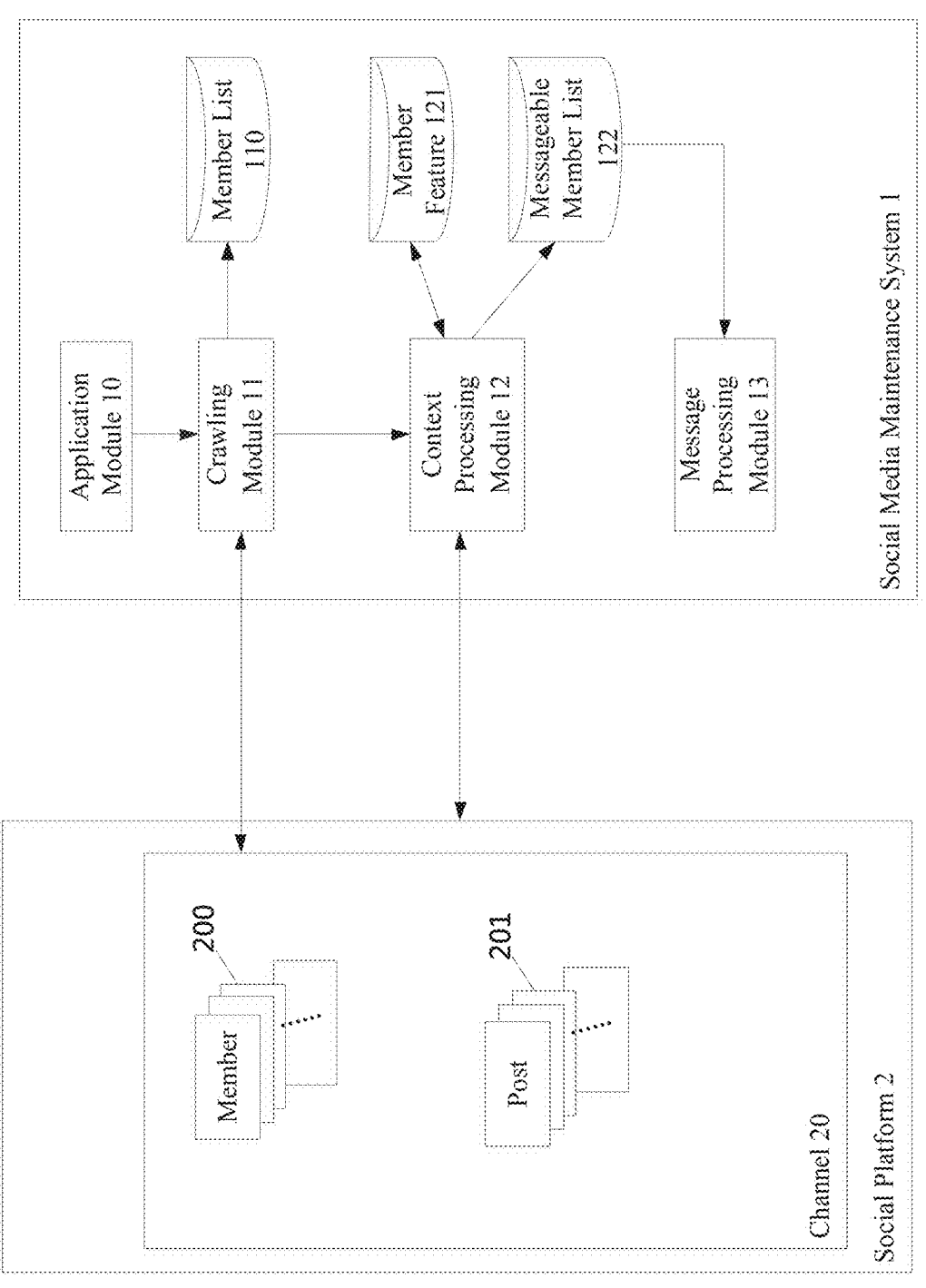
FIG. 1 is a block diagram illustrating the system architecture of the first embodiment of the social media maintenance system according to the present invention.

First, please refer to FIG. 1, which is a system architecture block diagram of the first embodiment of the social media maintenance system of the present invention. The first embodiment illustrates the basic system architecture for backing up the member data of a channel 20 on a social platform 2. The social media maintenance system 1 comprises an application module 10, a crawling module 11, a context processing module 12, and a message processing module 13.

Figure 2A:
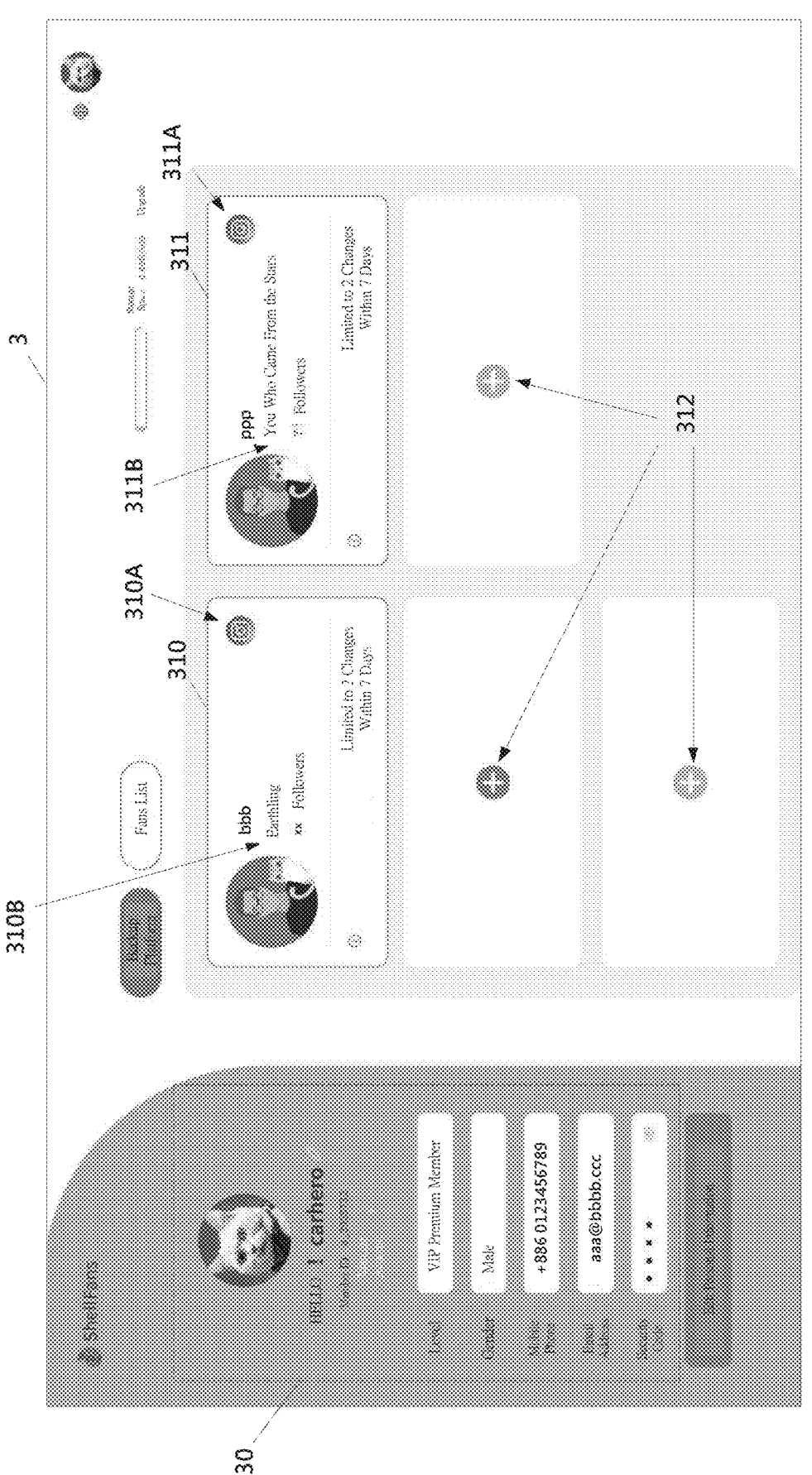
FIG. 2A illustrates a system interface obtained after a user who has completed member registration logs into the social media maintenance system according to the present invention.
Figure 2B:
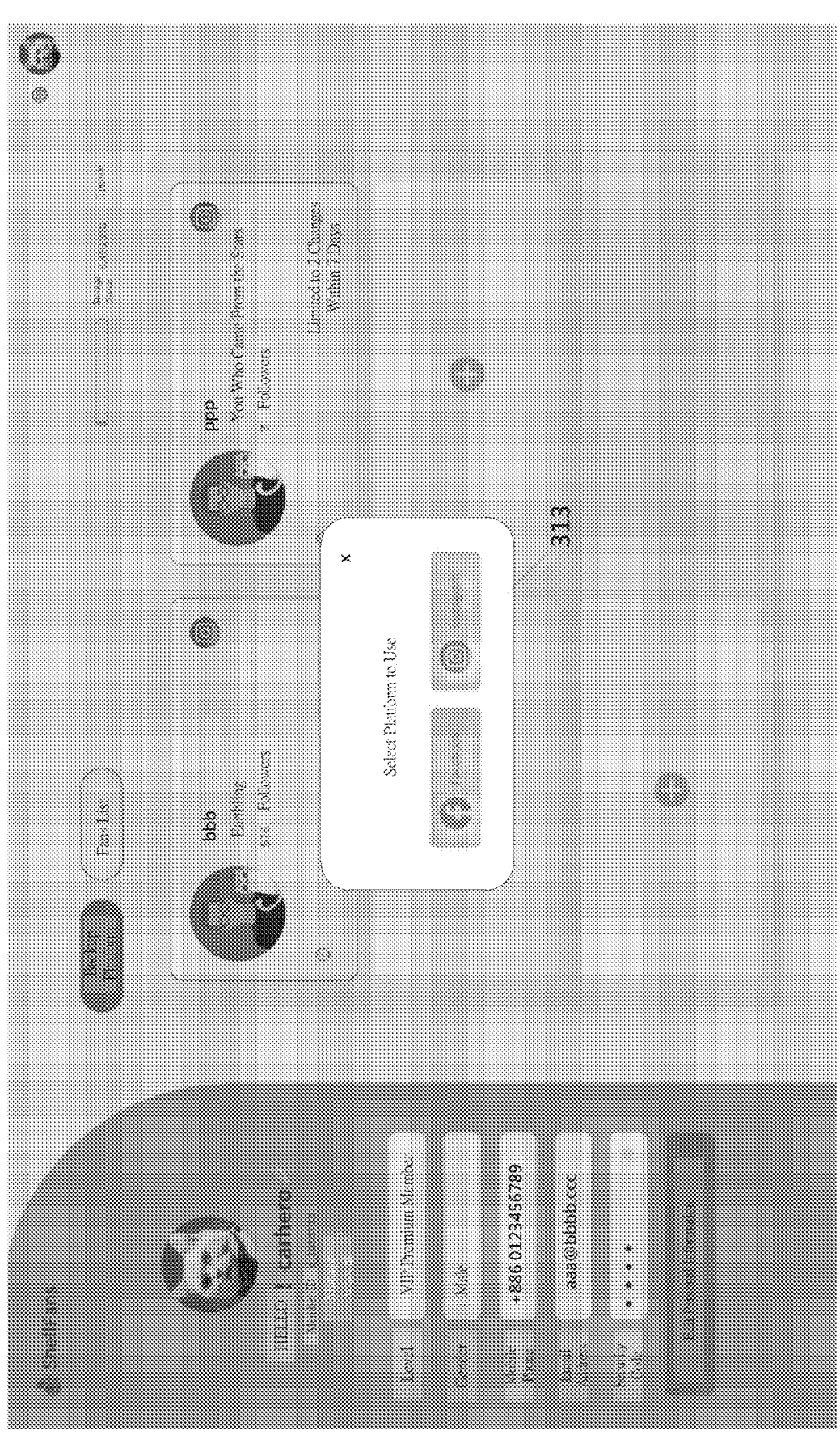
FIGS. 2B and 2C are respectively used to illustrate the service application operation interface of the social media maintenance system according to the present invention allows the user to input the desired social platform and the channels under that social platform to be maintained.
Figure 2C:
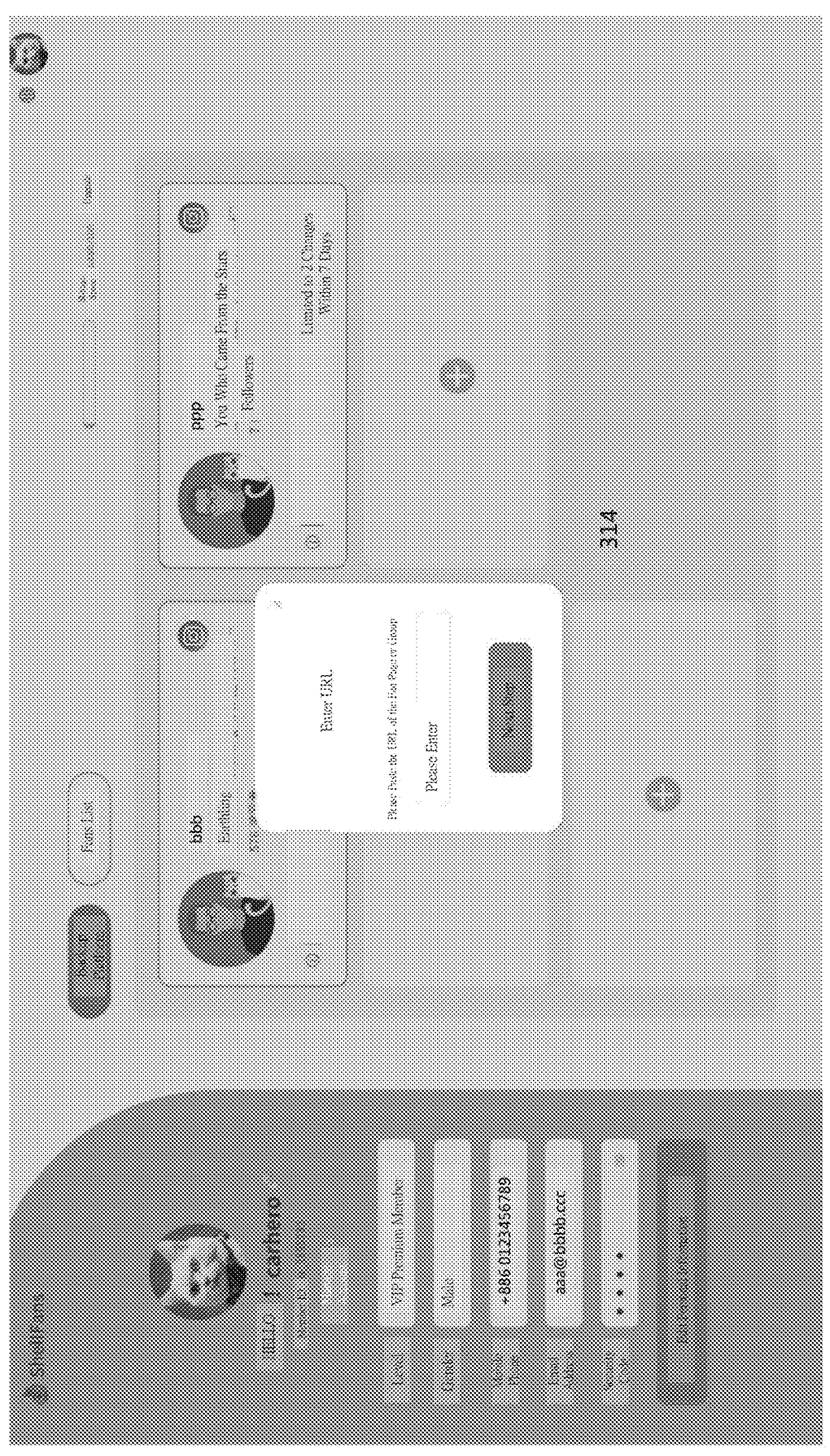

The application module 10 provides a service application operation interface (User Interface; UI) that allows users to select a social platform and input the channels to be maintained under the platform. To clearly illustrate the convenient input operations provided by the social media maintenance system 1 for backing up member data required by the user, please also refer to FIGS. 2A, 2B, and 2C. FIG. 2A shows a system interface 3 obtained after a user who has completed membership registration logs into the social media maintenance system 1. The system interface 3 comprises at least a user profile area 30 for the registered user, a maintenance-applied channel area (310, 311), and a channel maintenance-to-be-applied addition area 312. In the example of FIG. 2A, the user has applied to maintain two channels (310B, 311B), and the platform (310A, 311A) which both of the channels (310B, 311B) belong to is Instagram. The user can use the channel maintenance-to-be-applied addition area 312 to add channels to be maintained. After clicking, the application module 10 of the social media maintenance system 1 sequentially displays service application operation interfaces (313, 314) for the user to input the desired social platform and channels under that platform, as shown in FIGS. 2B and 2C. It should be noted that the social platform options provided by the service application interface 313 are not limited to Facebook or Instagram, as shown in this embodiment, but can comprise other options such as YouTube, LinkedIn, or Telegram. Furthermore, the user input method for selecting social platforms and channels is not restricted to using two separate service application interfaces (313, 314) as in this embodiment; they can be combined into a single service application interface, depending on the implementation.

The application module 10, after receiving the user-inputted social platform 2 and the channels 20 under it via the service application interface (313, 314), generates a dedicated bot based on the attributes of the social platform 2. This dedicated bot has a membership account for logging into the social platform 2 and joins the channel 20 to become a member of the channel 20. Additionally, the dedicated bot can act as the user's proxy. It should be specifically noted that the application module 10 verifies whether the user applying for backup services has administrative rights to the channel 20 or is the channel's owner. If the user lacks administrative rights or is not the owner, the application for backup services will be rejected to prevent impersonation and potential misuse of channel data, which could lead to fans being deceived or exploited.

The crawling module 11 allows the dedicated bot, which has joined the channel 20, to crawl the channel's content to obtain all member data of the channel 20 and create a member list 110 based on the crawled data. It should be noted that the method by which the dedicated bot joins the channel 20 depends on the channel's attributes. For example, if the channel 20 is a private group, the joining process requires approval by the user applying for backup services or an administrator of the channel 20. Conversely, if the channel 20 is a public group, no review process is needed, and the dedicated bot can join directly.

The context processing module 12 generates an associated bot based on the attributes of the social platform 2. This associated bot has a membership account for logging into the social platform 2, enabling it to perform context establishment with each member 200 based on the stored member list 110. The context processing module 12 also generates and stores a messageable member list 122 based on the context information obtained during the process. The context processing module 12 comprises crawling and analysis functions, allowing the associated bot to crawl publicly available information of the members 200 on the social platform 2, such as all channels they have joined and their activities, including likes, comments, or check-ins on posts in the channels.

Therefore, the context processing module 12 collects the contextual information of the members 200 based on their public information on the social platform 2 and analyzes their member features 121 for storage. This enables the associated bot to simulate the features of the members. The features of the members 200 comprise their geographical location (e.g., frequently visited areas, residence, or office), educational background, interests, and all channels they have joined. Based on these features, the associated bot simulates actions such as checking in at restaurants or locations frequently visited by the member 200, joining the same channels, or interacting with posts (e.g., commenting, liking, or sharing).

By continually simulating member features, the associated bot enhances the closeness of its contextual relationship with the simulated member to a messageable level. It then creates and stores a messageable member list 122 based on members who meet this level. The interaction methods used by the associated bot to simulate member features help avoid situations where its private messages are marked as "unknown messages" or placed in the recipient's "message request" or "other messages" folders.

Additionally, to further enhance the closeness of its contextual relationship with members 200, the associated bot can also join the channel 20 and become one of the members of the channel 20.

Figure 3:
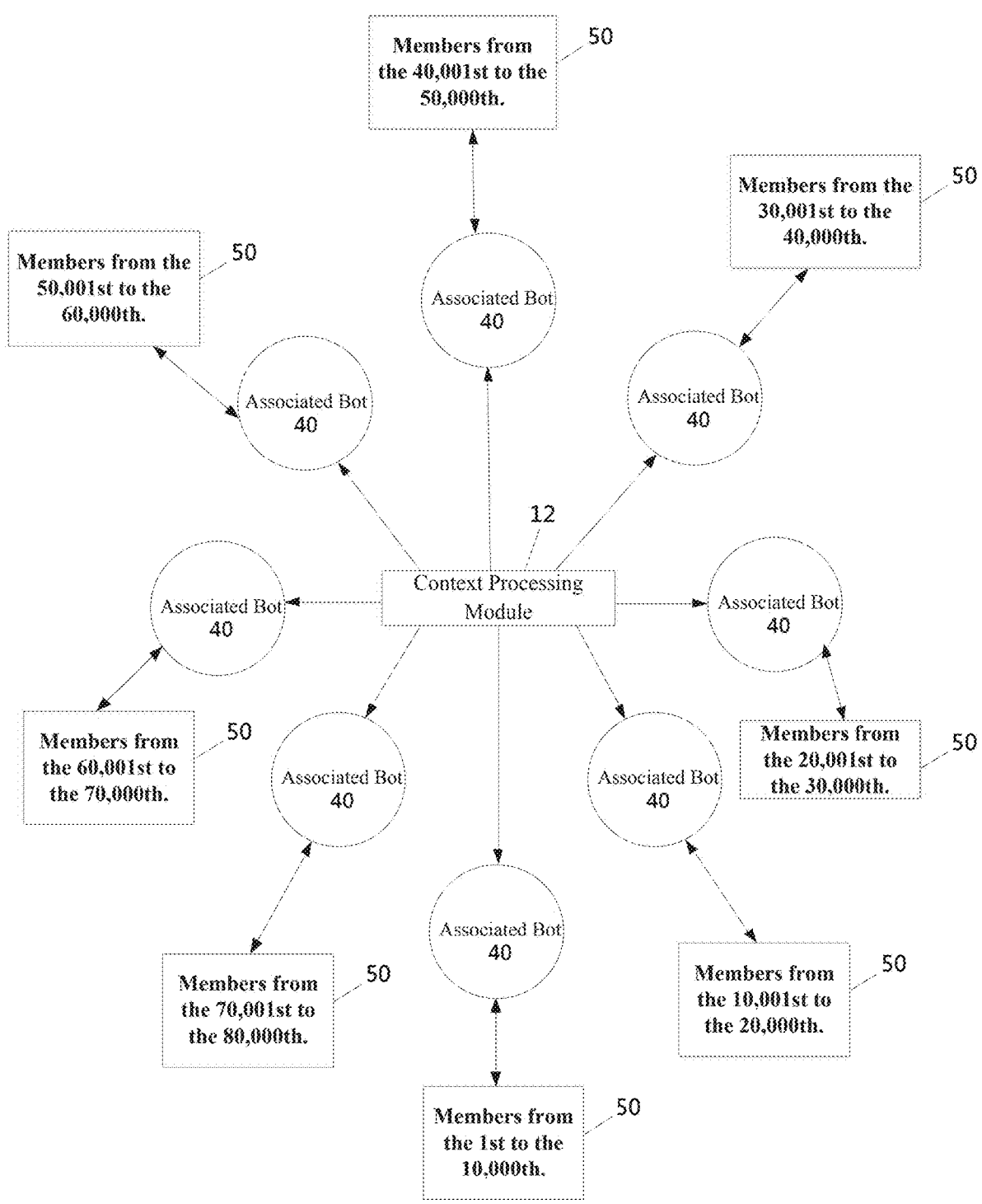
FIG. 3 is a schematic diagram illustrating the contextual processing module of the social media maintenance system according to the present invention, providing corresponding associated bots for each member group after grouping.

Furthermore, to more efficiently collect member contextual information for analyzing member characteristics and performing simulations, the context processing module 12 can group members based on the number of members in the member list 110, as shown in FIG. 3. Each member group 50 is assigned a corresponding associated bot 40, and each associated bot 40 performs context-establishing tasks for its respective member group 50. Through parallel processing by division of labor, the collection of member contextual information and simulation of member characteristics can be expedited. It should be noted that the number of associated bots 40 and the total number of members in a member group 50 are not limited to what is shown in FIG. 3, but may vary depending on implementation needs. Moreover, when the context processing module 12 facilitates the context-establishing tasks performed by the associated bot 40 for each member, and the social platform 2 blocks the associated bot from establishing context with the members, the context processing module 12 assigns a new associated bot to take over the context-establishing tasks of the blocked associated bot. The new associated bot reconstructs its contextual relationship with the member based on the stored member contextual information. More specifically, as the blocked associated bot is unable to log in to the social platform 2, its context-establishing tasks are interrupted, making it incapable of crawling public information of the member on the social platform. In such a case, the context processing module 12 assigns a new associated bot to simulate the previously analyzed member characteristic 121, thereby enhancing the closeness of the contextual relationship to a messageable level. Based on this relationship, the context processing module 12 generates and stores a messageable member list 122. Consequently, during subsequent private messaging, the new associated bot, having a close contextual relationship with the member, can send private messages to the member without being marked as unfamiliar messages by the social platform 2.

The message processing module 13 provides a private messaging interface. When the channel is blocked and interactions with members of the channel become impossible, the user can use the private messaging interface to select the desired social platform 2 and channel 200 and input the notification message to be sent. The associated bot then sends the notification message to the messageable members 200 based on the stored messageable member list 122.

To maintain the accuracy and validity of member data, the crawling module 11 directs the dedicated bot to crawl the content of the channel 20 at a predetermined time frequency or within a specific access scope, thereby updating or adding to the stored member list 110.

Hence, the social media maintenance system of the present invention can effectively prevent difficulties in interacting with members due to the unexpected blocking of channels.

Figure 4:
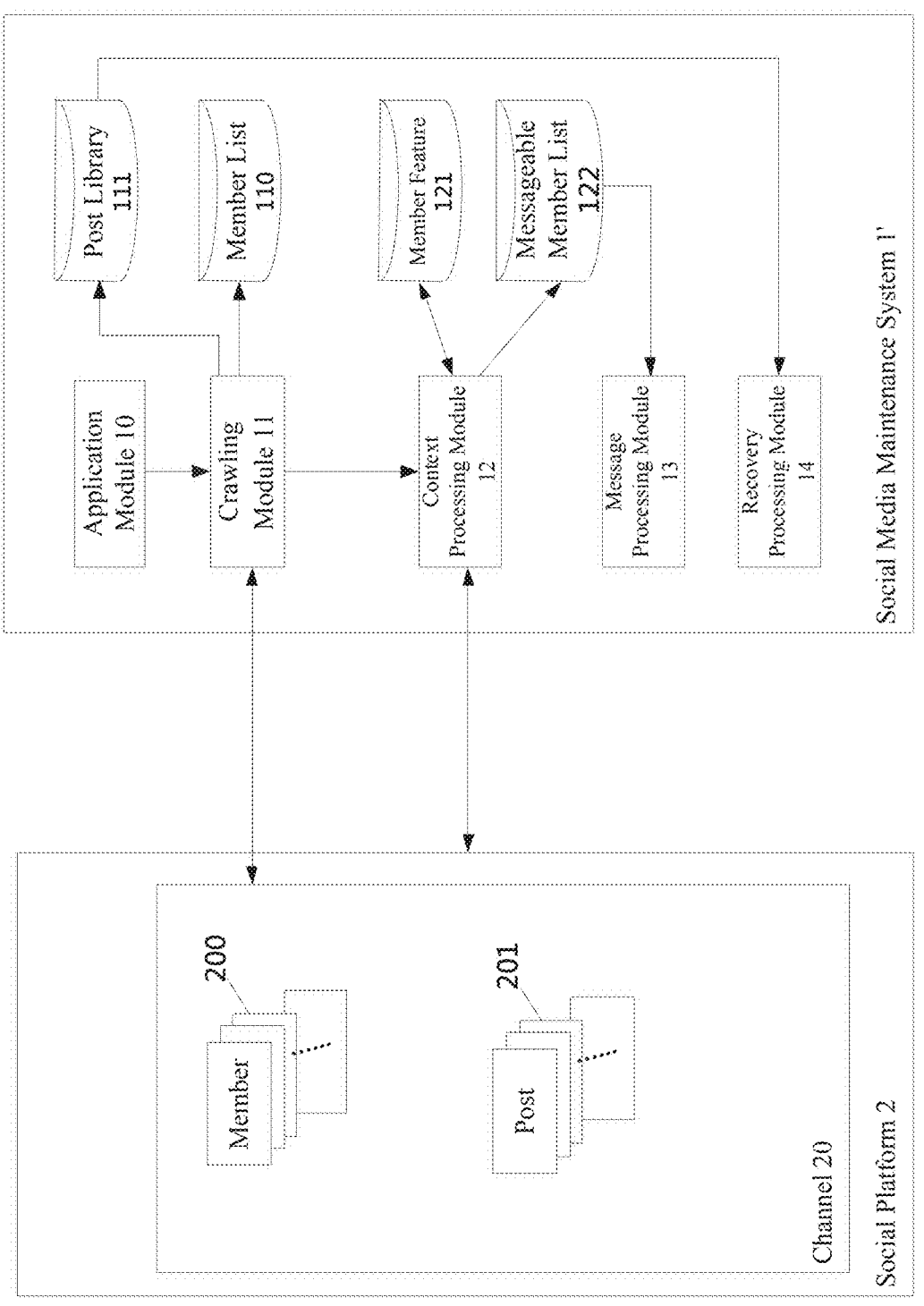
FIG. 4 is a block diagram illustrating the system architecture of the second embodiment of the social media maintenance system according to the present invention.

Referring to FIG. 4, which illustrates a system architecture block diagram of the second embodiment of the social media maintenance system of the present invention, this second embodiment is used to describe the basic system architecture for achieving the backup of the data of the post 201 of the channel 20 of the social platform 2. For simplification, only the differences from FIG. 1 are explained here. The social media maintenance system 1' of this embodiment further comprises: a recovery processing module 14 and a post library 111. Similarly to the preprocessing of the member data 200 of the channel 20 of the social platform 2 described above, i.e., as shown in FIGS. 2B and 2C, after the application module 10 receives the social platform 2 and the channel 20 under the social platform 2 input by the user via the service application operation interface (313, 314), the application module 10 further provides options for service content, such as the backup access scope being member data or post data, or the backup frequency being daily, weekly, or bi-monthly, etc. The application module 10 then generates a dedicated bot based on the attributes of the social platform 2 and adds it to the channel 20. The dedicated bot performs backup tasks in the channel 20 according to the selected options. In this embodiment, the crawling module 11 instructs the dedicated bot to crawl all the data of the post 201 in the channel 20 and store the data of the post 201 in the post library 111. Additionally, the crawling module 11 instructs the dedicated bot to crawl the data of the post 201 of the channel 20 according to the user-selected time frequency or access scope to update or add to the post library 111.

In the unfortunate event that the channel 20 is blocked, preventing the user from accessing the channel 20 on the social platform 2 for operations, the user can not only send private messages to members via the social media maintenance system 1' of this embodiment but also restore the posts. The recovery processing module 14 provides a recovery operation interface, allowing the user to select the social platform and channel they wish to restore via the recovery operation interface. The recovery processing module 14 then creates a new channel on the social platform 2 and restores the content of the blocked channel based on the posts stored in the post library 111 from the original channel. Specifically, the recovery processing module 14 creates a new channel on the social platform 2 and restores the posts of the blocked channel to the new channel. Meanwhile, the message processing module 13 instructs the associated bot to send a "channel change" notification to messageable members 200 based on the messageable member list 122 of the blocked channel. This notification can comprise a hyperlink to guide the members to the new channel or another social platform, ensuring that even if the original channel is blocked or has issues, the messageable members can still contact the user through the new channel. Therefore, even if the original channel is blocked or has operational problems, the social media maintenance system 1' of the present invention allows the original channel's members, managers, or owners to locate the original channel's members and post content.

Figure 5:
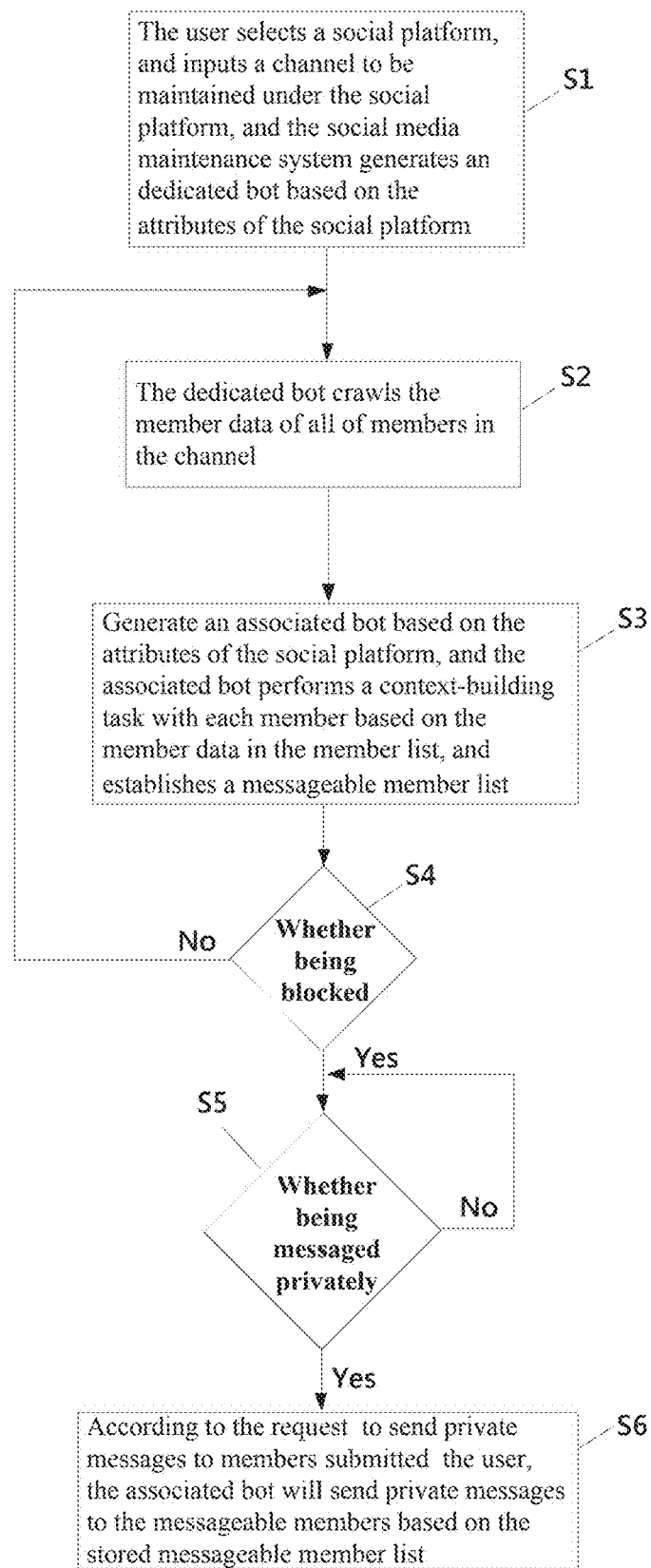
FIG. 5 is a flowchart illustrating the social media maintenance method according to the present invention.

Furthermore, the present invention also comprises a social media maintenance method. This method allows a user to process data under a channel of a social platform via a social media maintenance system, enabling the user to send private messages to the members of the channel without logging into the channel, thereby avoiding the difficulty of interacting with members when the channel is hijacked. As shown in FIG. 5, which illustrates a flowchart of the social media maintenance method of the present invention, the process starts with step S1, where the user logs into the social media maintenance system to submit a maintenance request, selecting a social platform and inputting the channel under the social platform to be maintained. The social media maintenance system generates a dedicated bot based on the attributes of the social platform and then proceeds to step S2.

In step S2, the dedicated bot joins the channel as a member of the channel, then crawls all member data of the channel and stores the member data in the social media maintenance system to create a member list. The process then moves to step S3.

In step S3, the social media maintenance system generates an associated bot based on the attributes of the social platform. The associated bot performs context establishment with each member based on the member data from the member list and establishes a messageable member list based on the member context information obtained during the context establishment process. This messageable member list is stored in the social media maintenance system. The process then proceeds to step S4. The acquisition of the member context information will be further explained in FIG. 6. Additionally, the messageable member list indicates the friend relationship between the associated bot and the members. By establishing the friend relationship, the social platform 2 perceives the associated bot and the members to have a certain degree of closeness, thus avoiding the situation where subsequent private messages sent by the associated bot are marked as "stranger messages" or end up in the "message request" or "other messages" folders of the members.

In step S4, the social media maintenance system determines whether the channel has been blocked. If it is confirmed that the channel has been blocked, the process proceeds to step S5; otherwise, the process returns to the aforementioned step S2, where the dedicated bot crawls all member data of the channel, and if new members are detected, the member list can be updated. Since each user logging into the social platform 2 has their own username and unique user identification code (UID), similarly, when the user joins the channel 20 as a member 200, they also have a username and unique user identification code. Therefore, when the dedicated bot crawls all member data 200 of the channel 20 and detects a new UID, it can determine that a new member has joined the channel 20.

In step S5, the social media maintenance system determines whether the user has requested to send private messages to members. If the user has submitted a request to send private messages to members, the process proceeds to step S6; otherwise, the process repeats step S5.

In step S6, since the channel 20 has been blocked, the user cannot log into the channel 20 to interact with the members 200. Therefore, the user can submit a request to send private messages to members via the social media maintenance system, and the associated bot will send private messages to the messageable members based on the stored messageable member list.

Referring to FIG. 6, which illustrates the processing steps of context establishment in step S3 of FIG. 5, in step S31, the associated bot crawls the public information of the members based on the member data from the member list in the social platform, and stores the public information in the social media maintenance system. The process then proceeds to step S32. The public information comprises, for example, the channels that the members 200 have joined on the social platform 2, and may also comprise active information such as posts liked, commented on, or checked into by the members 200 in the channels they have joined.

In step S32, the social media maintenance system collects the member context information based on the public information of the members to analyze the members' characteristics and stores the information in the social media maintenance system. The process then proceeds to step S33. Through the public information, the system can understand the lifestyle or work patterns of the members and utilize machine learning and big data analysis to derive the member context information, further analyzing the members' characteristics based on the context information. For example, if the member has joined multiple financial influencer channels or shares financial information or insights on their personal social platform, the system can analyze that the member has a preference for financial knowledge and categorize the channels of financial influencers and the interest in finance as one of the member's characteristics.

In step S33, the associated bot simulates the characteristics of the members based on the analyzed characteristics, enhancing the closeness of the context relationship between the associated bot and the members it wishes to simulate to a messageable level. The process then proceeds to step S34. By simulating characteristics, the similarity between the associated bot and the members of the channel increases, enhancing the correlation. This makes it easier for the social platform to perceive that the associated bot and the members may have a personal relationship or share similar interests. Consequently, when the associated bot sends private messages to members of the channel, the social platform is more likely to allow the members to receive the messages.

In step S34, the associated bot establishes the messageable member list based on the members who meet the messageable level and stores it in the social media maintenance system. When the channel is blocked and interaction with the members in the channel is no longer possible, the user can submit a request to send private messages to the members and input a notification message via the social media maintenance system. The associated bot will send the notification message to the messageable members based on the stored messageable member list.

In summary, the social media maintenance system and social media maintenance method of the present invention provide a convenient channel maintenance process, allowing users such as managers, influencers, or KOLs of social platforms to back up the channels they manage. Furthermore, it optimizes the process by restoring the original members and posts to another channel, ensuring that the control of the channel remains in the hands of the user and preventing situations where painstakingly managed social channels are hijacked.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. A social media maintenance method, which is provided for a user to process data under a channel of a social platform through a social media maintenance system, allowing the user to send private messages to a member of the channel without logging into the channel, and the social media maintenance method comprises the following steps:

(1) the user logs into the social media maintenance system to submit a maintenance request, selects a social platform, and inputs a channel to be maintained under the social platform, and the social media maintenance system generates a dedicated bot based on attributes of the social platform;

(2) the dedicated bot joins the channel as a member of the channel, crawls member data of all members in the channel, and stores the member data in the social media maintenance system to establish a member list;

(3) the social media maintenance system generates an associated bot based on the attributes of the social platform, and the associated bot performs a context-building task with each member based on the member data in the member list, and establishes a messageable member list based on the member context information obtained during the context-building task, which is stored in the social media maintenance system; and (4) the user submits a request to send private messages to a member through the social media maintenance system, enabling the associated bot to send private messages to a messageable member based on the stored messageable member list.

2. The social media maintenance method of claim 1, wherein in step (3), the context-building task comprises the following processing steps:

the associated bot crawls the public information of the member from the social platform based on the member data in the member list and stores the public information in the social media maintenance system;

the social media maintenance system collects member context information based on the public information of the member to analyze their features and stores the analyzed features in the social media maintenance system;

the associated bot simulates the features of the member based on the analyzed features to make the features of the associated bot similar to a member it intends to simulate, thereby increasing closeness of contextual relationship between the associated bot and a member to be simulated to a messageable level; and the associated bot establishes the messageable member list based on a member who meets the messageable level and stores the messageable member list in the social media maintenance system, allowing the user to submit a request to send private messages to a member through the social media maintenance system and enabling the associated bot to send private messages to a messageable member based on the messageable member list.

3. The social media maintenance method of claim 2, wherein the dedicated bot crawls the channel content with a predetermined time frequency or access range to update or add to the member list, the messageable member list, or member features stored in the social media maintenance system.

4. The social media maintenance method of claim 3, wherein in step (3), the associated bot joins the channel and becomes one of the members of the channel, thereby increasing the closeness of the contextual relationship between the associated bot and a member.

5. The social media maintenance method of claim 2, wherein the features of the member comprise their geographical location, educational background, hobbies and interests, or other joined channels, and the geographical location refers to areas frequently visited, residence, or workplace of the member.

6. The social media maintenance method of claim 1, wherein in step (3), the social media maintenance system performs grouping based on number of members in the channel from the member list and provides each group with a corresponding associated bot, and each of the associated bots performs the context-building task with its respective member group.

7. The social media maintenance method of claim 1, wherein in step (3), if the social platform blocks the associated bot from performing the context-building task with a member, the social media maintenance system assigns another new associated bot to take over the context-building task performed by the blocked associated bot, and the new associated bot re-establishes contextual relationships with the member based on the stored member context information.

8. The social media maintenance method of claim 3, wherein in step (2), the dedicated bot further crawls all posts in the channel and stores them in the social media maintenance system to enable the user to submit a channel restoration request through the social media maintenance system, creating a new channel on the social platform and restoring the channel content based on the stored posts.

* * * * *